Sept. 6, 1966 L. C. BRIEGER ETAL 3,271,724
STAKE ON CONTACT
Filed Jan. 3, 1963
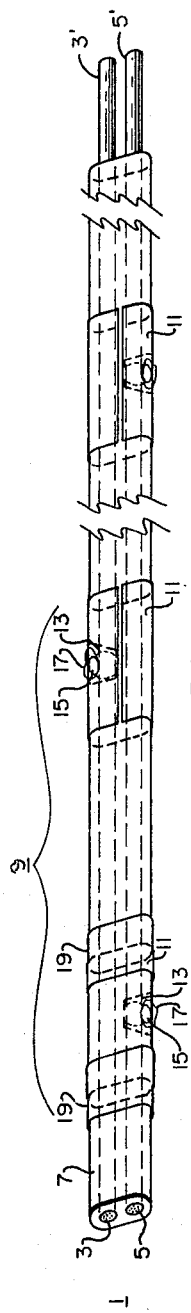
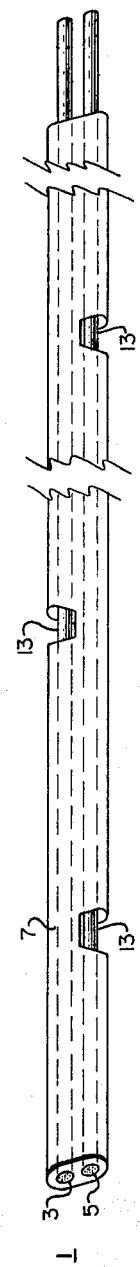
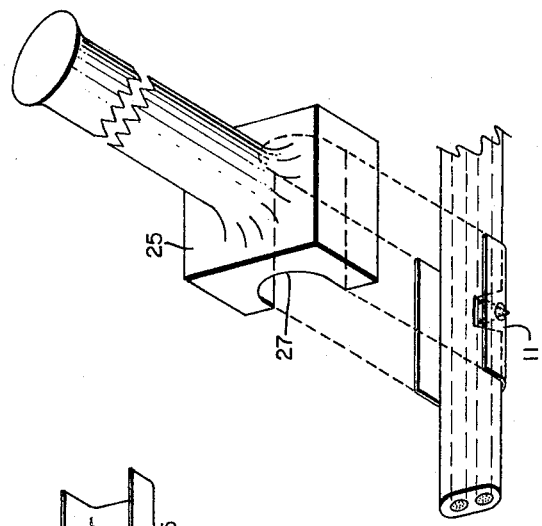
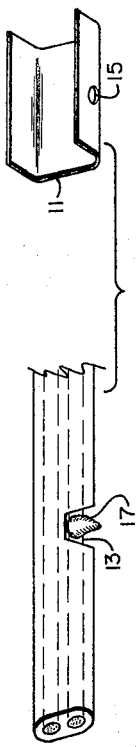
INVENTORS.
Lewis C. Brieger.
Henry R. Barta.
BY
Charles F. Steininger
ATTORNEY.

United States Patent Office 3,271,724
Patented Sept. 6, 1966

3,271,724
STAKE ON CONTACT
Louis C. Brieger and Henry R. Barta, Dallas, Tex., assignors to The Atlantic Refining Company, Philadelphia, Pa., a corporation of Pennsylvania
Filed Jan. 3, 1963, Ser. No. 249,282
7 Claims. (Cl. 339—22)

This invention relates to an improved multicontact cable and method of manufacture. More specifically, the invention relates to an improved geophysical jumper cable adapted to receive a plurality of geophones and the method of manufacturing the jumper cable.

During the past twenty years, the cost and complexity of geophysical exploration equipment have increased significantly. This increase can be partially attributed to the more sophisticated exploration techniques being used and to the wider range of severe climatic conditions under which the equipment is required to operate. Even relatively simple equipment such as jumper cables has become expensive and complex to make and to repair. Today, geophysical jumper cables are sometimes required to operate with up to approximately 200 geophones. This means that the cable must have an equivalent number of geophone take out connections and that each connection must be able to withstand rough exploration treatment and be able to operate under varied climatic conditions. U.S. Patent No. 2,842,750 to Randall et al. illustrates one type of take out connection presently used on jumper cables. Regardless of the type of take out used, the cables are complex and expensive to manufacture and expensive and difficult to repair.

Accordingly, it is an object of the present invention to provide an improved jumper cable and method of manufacture.

Another object of the present invention is to provide an improved, simplified take out connection that can be installed in the field with minimum effort and expense.

Another object of the present invention is to provide an improved, economical method of placing take out connections on a jumper cable.

Another object of the present invention is to provide an improved geophysical jumper cable having take out connections that produce minimum resistance to cable movement.

Another object of the present invention is to provide an improved, lightweight jumper cable having take out connections that directly contact the conductors so that exterior loops of conductor are not required and the conductors' relative positions in the cable are unaffected.

These and other objects of the present invention will become apparent when the description is read with the accompanying drawings.

FIGURE 1 is a schematic drawing of a section of the improved jumper cable.

FIGURES 2A through 2D are schematic drawings of various steps that can be used to manufacture the improved jumper cable.

Briefly described, the invention includes a novel, simplified take out connection for a jumper cable, the method of making and installing the connection. For purposes of this disclosure the term "cable" shall mean a nonconductive member, with or without a covering sheath, containing electrical conductors, each conductor electrically insulated from the remaining conductors. The term "conductor" shall mean one or more strands of wire adapted to serve as a single electrical conductor. The term "take out" or "take out connection" shall mean a pair of electrical outlets suitable for receiving a pair of geophone clip on connectors or the like.

Refer now to FIGURE 1 which shows an isometric drawing of jumper cable 1, not to scale, containing conductors 3 and 5, insulation 7, and take out 9. Take out 9 includes two electrically conductive, deformable members 11 bent around the periphery of cable 1. Each take out includes a member 11 electrically connected to conductor 3 and a member 11 electrically connected to conductor 5 as shown. Each member 11 is positioned over an exposed section 13 of its respective conductor. Each exposed section is relatively free of insulation to provide electrical contact with its respective member 11. Aperture 15 is located in each member 11 and is positioned over its respective exposed section of conductor. A quantity of electrically conductive bonding substance 17, for example, metallic solder, is placed on each exposed section and through and around aperture 15 so that 11 is electrically connected and bonded to its respective exposed section of conductor. Optional collars 19, made of tape, plastic, etc., can be positioned on both sides of each member 11 to prevent the ends of 11 from wearing the insulation on cable 1. The collars can also be used to identify the conductor to which member 11 is bonded. That is, a predetermined color, size, etc. of a collar can be used as a legend to identify a given conductor so that all geophones can be connected to the cable with same polarity. The ends of conductors 3 and 5 identified as 3' and 5' can be used to connect to a conventional seismic road cable or to a recording truck. Of course, this connection can utilize clips, jacks or other conventional connecting means.

Although the jumper cable can be manufactured in various ways, for purposes of explanation, the method illustrated in FIGURES 2A–2D will be described first. Assume that the jumper cable is to be made out of Special Grooved Twin Amergraph Cord TG-2 made by American Steel & Wire, division of United States Steel. The cable is shown in FIGURE 2A as 1. Each conductor 3 and 5 is made of 25 strands of No. 34 cadmium bronze and 8 strands of No. 34 hard drawn copper. The method of manufacturing the jumper cable can include the following steps although not necessarily performed in the order described.

Portions of insulation 7 are removed from alternate conductors 3 and 5 leaving exposed sections 13 as shown in FIGURE 2A. The two exposed sections 13 in each take out 9 are on alternate conductors and are displaced laterally from each other by a suitable distance. This distance must be great enough to prevent the two members 11 from contacting each other and close enough to accommodate the two conductor clips from a geophone. In the illustrated embodiment, the two exposed sections are approximately one-half inch long and are separated laterally by a distance of approximately 2½ inches. The distance between take outs depends upon the maximum geophone density desired and the length of the cable. In the illustrated embodiment, the second take out section 9 is displaced approximately 15 feet from the first take out. Insulation 7 can be removed from section 13 with a pair of wire dikes, with a commercially available automated insulation remover, or with any other suitable device. It should be understood that if cable 1 is made with section 13 already exposed, the above-described step is not required. Although it is desirable to scrape and fully expose all of section 13 to insure a good electrical connection, section 13 is not drawn from the cable body to produce a loop connection as is common in the prior art. That is, section 13 is allowed to remain generally along the longitudinal axis of the unexposed sections of the conductor. As shown in FIGURE 2A, each section 13 is a notch formed in the sides of cable 1 to alternately expose conductors 3 and 5. This simplifies manufacture and minimizes the distance the finished take out connection projects from the cable.

Conductive member 11 can be made in various ways. The illustrated embodiment was made with a progressive die. When a die is utilized, it has been found that a one inch strip of 14 ounce U.S. standard gauge .0189 inch cold rolled copper sheet serves as satisfactory stock. The progressive die operates on the copper sheet to punch aperture 15 and to form the stock into a generally U-shaped member with the aperture positioned as shown and to separate the member from the remainder of the stock.

If it is not desirable to produce the conductive members with the progressive die, generally rectangular strips of the desired dimensions can be cut or sheared, the apertures punched, and the strip formed or bent into a generally U-shaped configuration in any of a number of well-known methods. In any event, it is preferable that the width of the conductive member be slightly less than the periphery of the cable so that the ends of the conductive member do not overlap when they are bent around the cable.

Exposed sections 13 are tinned or covered to facilitate soldering or bonding conductive members 11 to their respective conductors. A quantity of electrically conductive bonding substance or metallic solder is placed on each section so that it projects up from the conductor approximately 1/16 inch.

The generally U-shaped conductive member 11 is placed around cable 1 and a portion of the quantity of bonding substance or metallic solder is projected through the aperture in the conductive member as shown in FIGURE 2C.

The ends of the generally U-shaped conductive member 11 are staked around cable 1 as shown in FIGURE 2D. The staking tool 25 is placed over the U-shaped member and the end of the tool is struck sharply with a hammer or a press. This action bends the ends of the generally U-shaped members around the upper portion of the cable as shown in FIGURE 1 so that the U-shaped member contacts the cable at at least two points located on opposite sides of the cable. Indentation 27 in the base of 25 is made to receive the upwardly extending legs of 11 and to bend them around cable 1 in a manner conventional to staking operations. Of course, bending, crimping, or other suitable operation can be substituted for staking to bend 11 around the cable.

The conductive member is electrically bonded or soldered to its conductor. When the bonding substance is a metallic solder, this can be done by heating 11 with a soldering iron and adding additional metallic solder around the aperture until it merges with metallic solder 17. Caution should be used in overheating 11; otherwise, metallic solder 17 between 13 and 11 will bubble and produce a poor electrical connection.

Although the inventive concept has been described utilizing the illustrated embodiments, various modifications and substitutions will occur to those skilled in the art without departing from the scope of the invention. For instance, the types of materials used, the sequence of operations, and the manner of performing the various steps can be varied. One such variation can include utilizing circular conductive (sleeve) members 11 slightly larger than the diameter of a circular cable 1, FIGURE 1, and slipping these sleeves over the cable instead of crimping the shaped members thereto. In this case the electrical connection can be made by depositing solder in aperture 15 in a manner to join section 13 to sleeve member 11. Another variation can utilize the step of soldering the edge of a conductive member 11, circular or otherwise, to expose section 11 so that aperture 15 is not required. Another variation can substitute spot welding or the use of a conductive epoxy for the metallic soldering step. In view of these variations and others obvious to those skilled in the art in light of this disclosure, the scope of the present invention is to be limited only by the appended claims.

We claim:
1. An improved geophysical jumper cable adapted to receive a geophone comprising
   (a) a cable containing first and second conductors insulated from each other, said cable having notches formed in the sides thereof to expose alternate sections of said conductors, said exposed sections being spaced from each other and positioned generally along the longitudinal axes of their respective unexposed sections,
   (b) a geophone take out positioned along at least a portion of said cable, said take out including
      (1) a first electrically conductive member positioned around a major portion of the cable's periphery, said first member electrically connected to one of said exposed sections of said first conductor,
      (2) a second electrically conductive member positioned around a major portion of the cable's periphery, said second member electrically connected to one of said exposed sections of said second conductor located adjacent said first member.

2. In a jumper cable as set forth in claim 1 wherein the cable's periphery is substantially rectangular in shape.

3. An improved geophysical jumper cable adapted to receive a geophone comprising
   (a) first and second insulated conductors, each of the conductors having alternate exposed sections substantially free of insulation, said exposed sections positioned generally along the longitudnial axes of their respective unexposed sections,
   (b) a geophone take-out positioned along at least a portion of said cable, said take-out including
      (1) a first electrically conductive member positioned around a major portion of the cable's periphery, said first member having a surface with an aperture therethrough opposite one of said exposed sections of said first conductor, a quantity of electrically conductive bonding substance connected to said first conductor and to said surface of said first conductive member around and in said aperture in said surface of said first conductive member, said bonding substance electrically connecting said first member to one of said exposed sections of said first conductor,
      (2) a second electrically conductive member positioned around a major portion of the cable's periphery, said second member having a surface with an aperture therethrough opposite one of said exposed sections of said second conductor, a quantity of electrically conductive bonding substance connected to said second conductor and to said surface of said second conductive member around and in said aperture in said surface of said second conductive member, said bonding substance electrically connecting said second member to one of said exposed sections of said second conductor.

4. In a jumper cable as set forth in claim 3 wherein the cable's periphery is substantially rectangular in shape.

5. A method of placing take out connections on a seismic jumper cable containing at least first and second individually insulated coductors, which method comprises
   (a) covering a first exposed section of said first conductor with an electrically conductive bonding substance to produce a quantity of said bonding substance on at least a portion of said first exposed section of said first conductor,
   (b) positioning a generally U-shaped electrically conductive deformable member containing an aperture around said cable with said aperture adjacent said electrically conductive bonding substance,
   (c) bending the ends of said member around said cable causing said member to encircle said cable, (d) bonding said member to said first exposed section with electrically conductive bonding substance, and (e) repeating steps (a) through (d) on a second exposed section of said second conductor displaced laterally a predetermined distance from said first exposed section of said first conductor.

6. In a method as set forth in claim 5 wherein the method includes added steps for forming the at least two generally U-shaped electrically conductive deformable members, which added steps comprise cutting two generally rectangular-shaped electrically conductive deformable members, placing an aperture in each of said members intermediate the ends thereof, and bending each of said members into a generally U-shaped configuration.

7. In a method as set forth in claim 5 wherein the method includes added step for forming the first and second exposed sections of the first and second conductor, respectively, which added step comprises removing a part of the insulation from a section of each of the conductors.

References Cited by the Examiner
UNITED STATES PATENTS

| | | | |
|---|---|---|---|
| 731,400 | 6/1903 | Worthington | 339—277 |
| 2,046,129 | 6/1936 | Mucher. | |
| 2,119,776 | 6/1938 | Clayton | 339—22 |
| 2,119,782 | 6/1938 | Fullman | 339—22 |
| 2,389,738 | 11/1945 | Olney | 113—42 |
| 2,434,375 | 1/1948 | Van Saun | 113—42 |
| 2,515,256 | 7/1950 | O'Brien et al. | 339—175 |
| 2,609,415 | 9/1952 | Benander et al. | 339—99 |
| 2,610,390 | 9/1952 | Locke | 29—155.55 |
| 2,700,206 | 1/1955 | Gilbert | 29—155.55 |
| 2,820,843 | 1/1958 | Dreher | 174—71 X |
| 2,842,750 | 7/1958 | Randall et al. | 339—151 |
| 3,153,119 | 10/1964 | Hart | 339—59 X |

EDWARD C. ALLEN, *Primary Examiner.*

PATRICK A. CLIFFORD, JOSEPH D. SEERS,
*Examiners.*